United States Patent [19]

Mueller et al.

[11] Patent Number: 5,057,231

[45] Date of Patent: Oct. 15, 1991

[54] METHOD FOR STARTING UP AND CONTROLLING OPERATING TEMPERATURE OF A WET OXIDATION PROCESS

[75] Inventors: Gene W. Mueller, Easton; Bruce L. Brandenburg, Rib Mountain, both of Wis.

[73] Assignee: Zimpro Passavant Environmental Systems, Inc., Rothschild, Wis.

[21] Appl. No.: 610,922

[22] Filed: Nov. 8, 1990

[51] Int. Cl.⁵ .............................................. C02F 1/72
[52] U.S. Cl. .................................... 210/761; 210/181; 210/766; 210/742
[58] Field of Search ............... 210/758, 761, 766, 742, 210/767, 181, 195.1

[56] References Cited

U.S. PATENT DOCUMENTS

| | | | |
|---|---|---|---|
| 2,903,425 | 9/1959 | Zimmerman | 210/761 |
| 2,932,613 | 4/1960 | Huesler et al. | 210/761 |
| 3,272,740 | 9/1966 | Gitchel et al. | 210/761 |
| 3,808,126 | 4/1974 | Pradt | 210/761 |
| 3,876,497 | 4/1975 | Hoffman | 210/761 |
| 4,624,842 | 11/1986 | Grotz, Jr. | 423/360 |
| 4,744,966 | 5/1988 | Grotz | 423/360 |

Primary Examiner—Stanley S. Silverman
Assistant Examiner—Neil M. McCarthy
Attorney, Agent, or Firm—Michael, Best and Friedrich

[57] ABSTRACT

A method for starting up and controlling the temperature of a wet oxidation process in which a heat exchanger employing superheated steam is used to initially heat a waste stream introduced into a wet oxidation reaction vessel for start up and then to subsequently adjust the temperature of the waste stream, after it is preheated by the effluent from the reaction vessel, to a level suitable to maintain steady state operation of the reaction vessel.

1 Claim, 1 Drawing Sheet

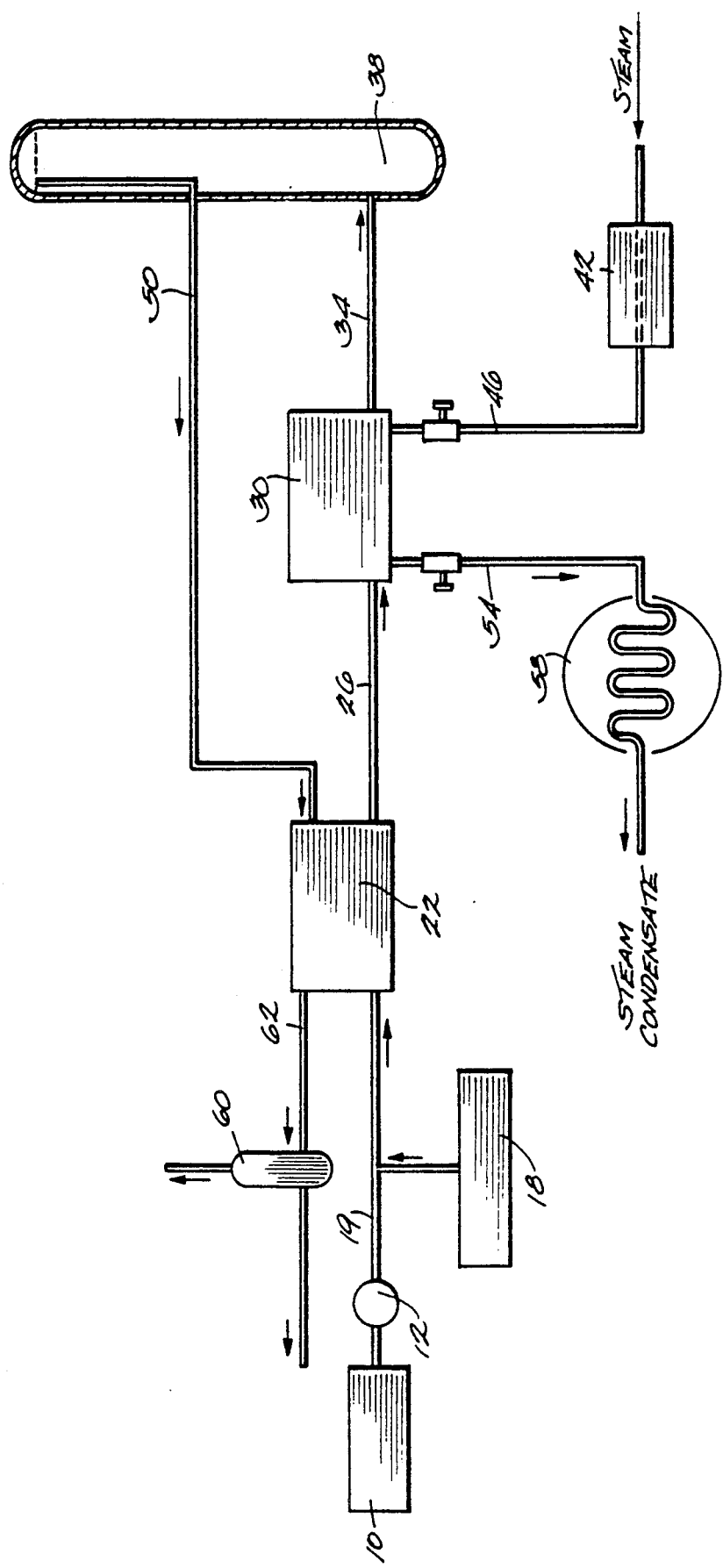

METHOD FOR STARTING UP AND CONTROLLING OPERATING TEMPERATURE OF A WET OXIDATION PROCESS

BACKGROUND OF THIS INVENTION

1. Field of the Invention

This invention relates to wet oxidation of aqueous wastes, and, more particularly, to methods for controlling the operating temperature of wet oxidation processes.

2. Description of the Prior Art

Wet oxidation, which is used to treat aqueous waste containing combustible organic and inorganic materials, involves the reaction of an oxygen-containing gas with these materials at elevated temperatures and pressures. Various components in raw waste oxidize at different rates, so in one mode of operation an oxygen-containing gas is mixed with the raw waste and the resultant influent introduced into a reaction vessel where the mixture is retained under elevated temperature and pressures for a sufficient time for the oxidation reactions to take place. The oxidation reaction generally is exothermic and some form of heat exchange typically is used to remove heat from the oxidized waste or reaction vessel effluent and preheat the influent before being introduced into the reaction vessel. To maximize the effectiveness of the heat transferred from the effluent to the influent, the oxygen-containing gas can be mixed with the raw waste prior to the preheating step.

In some cases, a highly reactive waste can begin to oxidize prior to the influent entering the reaction vessel, usually during or shortly after preheating. The resulting temperature fluctuations of the influent makes it difficult to control the steady state or operating temperature in the reaction vessel so that the desired oxidation reactions can take place without excessive temperature and/or pressure build up. Also, during the start-up of some wet oxidation processes, it is advantageous to reach steady state conditions within a relatively short time.

Steam heat exchangers have been used for initially heating the influent to a wet oxidation reactor during start-up. This is disclosed in Zimmerman U.S. Pat. No. 2,903,425 issued Sept. 8, 1959 and Hoffman U.S. Pat. No. 3,876,497 issued Apr. 8, 1975. Also, Grotz U.S. Pat. No. 4,624,842 issued Nov. 25, 1986 and Grotz U.S. Pat. No. 4,744,966 issued May 17, 1988 disclose using superheated steam to cool that effluent from an exothermic reaction.

Applicant is unaware of any prior art wet oxidation processes where a heat exchanger and superheated steam are used to initially heat the influent stream during the start-up of the process and then used to cool a preheated influent to a temperature desired for steady state operation.

SUMMARY OF THE INVENTION

An object of the invention is to provide a method for rapidly starting up and subsequently controlling the reaction temperature of the wet oxidation process for treating an aqueous waste containing combustible materials.

Another object of the invention is to provide such a method in which heat is removed from an effluent to preheat the influent.

A further object of the invention is to provide such a method which utilizes the same heat exchanger and steam superheater to initially heat the influent for start-up and to subsequently adjust the temperature of the preheated influent to a temperature suitable for steady state operation.

The invention provides a process for initially quickly heating a waste stream in a wet oxidation process and subsequently adjusting the temperature of the waste stream once the operating conditions of the process are attained.

The process comprises mixing an oxygen-containing gas with an aqueous waste to form an influent for wet oxidation, passing the influent through a first heat exchanger, a second heat exchanger and then into a reaction vessel for wet oxidation. Superheated steam is passed through the second heat exchanger to heat the influent to a temperature sufficient to initiate the desired wet oxidation reaction in the reaction vessel and for a start-up time period sufficient to cause the oxidation reactions in the reaction vessel to substantially stabilize. Oxidized effluent is withdrawn from the reaction vessel and passed through the first heat exchanger to preheat the influent to a temperature sufficient to initiate wet oxidation. After the start-up period, the temperature and flow of the superheated steam passing through the second heat exchanger are adjusted to adjust the temperature of the preheated influent to a temperature suitable for continued steady state operation of the reaction vessel.

DESCRIPTION OF THE DRAWINGS

FIG. 1 is a schematic flow diagram of a wet oxidation process employing the present invention.

DESCRIPTION OF THE PREFERRED EMBODIMENT

A wet oxidation process for treating an aqueous waste containing combustible organic and inorganic materials is illustrated in FIG. 1. The aqueous waste is pumped from a storage tank 10 through pump 12 and as it flows through a conduit 14 it is mixed with a pressurized oxygen-containing gas, such as air, supplied by a compressor 18 to form ar influent for wet oxidation. The influent sequentially passes through a first exchanger 22, a conduit 26, a second heat exchanger 30, and a conduit 34 and then into a reaction vessel 38 where it is retained under predetermined temperature and pressure conditions to produce the desired oxidation reactions.

Superheated steam supplied by a superheater 42 passes through a conduit 46 and the second heat exchanger 30. During the start-up of the wet oxidation process, the temperature and flow of the superheated steam are controlled in a suitable manner so that the amount of heat transferred from the superheated steam to the influent heats the influent to a temperature sufficient to initiate an exothermic wet oxidation reaction in the reaction vessel 38. This temperature varies, depending primarily on the composition of the particular aqueous waste being treated. Generally, the start-up temperature is about 200° to about 480° F.

An effluent containing oxidation reaction products is withdrawn from the reaction vessel 38 via a conduit 50 and passed through the first heat exchanger 22. After a start-up period sufficient for the exothermic wet oxidation reaction in the reaction vessel 38 to become substantially stabilized, heat transferred from the effluent to the influent in the first heat exchanger 22 preheats the influent to a temperature sufficient to initiate the exothermic wet oxidation reaction. The combination of heat transferred from the effluent to influent in the first heat exchanger 22 and the heat produced by the exothermic wet oxidation reaction can result in the influent being heated to a temperature which would destablize the steady state conditions within the reaction vessel 38. That is, the preheated influent may be at a temperature below or above that suitable for continued steady state operation of the reaction vessel 38.

The temperature and flow of the superheated steam supplied to the second heat exchanger 30 are adjusted so that, depending on the temperature of the preheated influent, the amount of heat transferred from the preheated influent to the superheated steam or from the superheated steam to the preheated influent in the second heat exchanger 30 cools or heats the preheated influent to a temperature suitable for the steady state operation of the reaction vessel 38. As with the start-up temperature, the operating temperature varies depending primarily on the composition of the aqueous waste. Generally, the operating temperature is about 300 to about 700° F., preferably about 400° to about 660° F. The reaction vessel 38 is also maintained at an elevated pressure of about 125 to about 5,000 psi, preferably about 300 to about 4,000 psi.

The superheated steam supplied to the second heat exchanger 30 provides a large amount of energy and a large differential temperature for rapidly heating the influent passing through the second heat exchanger 30. Thus, the heating required for the influent to reach the temperature for starting the wet oxidation process can be effected within a relatively short time.

The use of a cooling water to cool the preheated influent during steady state operation can cause control problems. That is, a cooling water having a large temperature differential can remove an undesired amount of heat at an undesired rate. On the other hand, use of superheated steam in the second heat exchanger in accordance with the invention permits heat to be removed from or added to the preheated influent at a low rate and in an easily controllable manner. This can be accomplished by simply adjusting the superheater 42 in a suitable manner to provide superheated steam at a desired temperature and, by valving or other suitable flow control means, adjusting the flow of the superheated steam through the second heat exchanger 30. In some cases, the steam actually will be superheated by the preheated influent passing through the second heat exchanger 30.

Steam exiting from the second heat exchanger 30 can be introduced via a conduit 54 into a cooler 58 for recovering water which can be recycled for re-use in the process. Also, the cooled effluent exiting from the first heat exchanger 22 can be introduced via a conduit 62 into a separator 60 where gases separated from the effluent can be exhausted to the atmosphere or subjected to further treatment. The remaining liquid effluent can be disposed as waste or subjected to further treatment.

Various features of the invention are set forth in the following claims.

We claim:

1. A method for starting up and controlling the operating temperature in a wet oxidation process for treating an aqueous waste containing combustible materials, said process comprising the steps of:

mixing an oxygen-containing gas with said waste to form an influent for wet oxidation;

sequentially passing said influent through a first heat exchanger, a second heat exchanger and then into a reaction vessel for wet oxidation;

passing superheated steam through said second heat exchanger to heat said influent to a temperature sufficient to initiate the desire exothermic wet oxidation reaction in said reaction vessel and for a start-up time period sufficient to cause the wet oxidation reaction in said reaction vessel to substantially stabilize and reach a steady state condition;

withdrawing an oxidized effluent from said reaction vessel and passing said effluent through said first heat exchanger to preheat said influent; and after said start-up period, adjusting the temperature and flow of the superheated steam passing through said second heat exchanger to cool said preheated influent to a temperature suitable for continued steady state operation of said reaction vessel.

* * * * *